United States Patent
Buendgen et al.

(10) Patent No.: US 12,050,700 B2
(45) Date of Patent: *Jul. 30, 2024

(54) SECURE EXECUTION GUEST OWNER CONTROLS FOR SECURE INTERFACE CONTROL

(71) Applicant: International Business Machines Corporation, Armonk, NY (US)

(72) Inventors: Reinhard T. Buendgen, Tuebingen (DE); Jonathan D. Bradbury, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/657,165

(22) Filed: Mar. 30, 2022

(65) Prior Publication Data

US 2022/0222357 A1 Jul. 14, 2022

Related U.S. Application Data

(63) Continuation of application No. 16/296,478, filed on Mar. 8, 2019, now Pat. No. 11,354,421.

(51) Int. Cl.
*G06F 21/00* (2013.01)
*G06F 9/455* (2018.01)
(Continued)

(52) U.S. Cl.
CPC ........ *G06F 21/602* (2013.01); *G06F 9/45558* (2013.01); *G06F 21/575* (2013.01);
(Continued)

(58) Field of Classification Search
None
See application file for complete search history.

(56) References Cited

U.S. PATENT DOCUMENTS 7,424,543 B2  9/2008  Rice, III
9,152,794 B1 * 10/2015  Sanders ................ H04L 9/0877
(Continued)

FOREIGN PATENT DOCUMENTS

EP      3140770       3/2017
JP      2016511872 A  4/2016
(Continued)

OTHER PUBLICATIONS

Notice of Acceptance for Patent Application, Application No. 2020233906, Jan. 6, 2023, 3 pages.
(Continued)

*Primary Examiner* — Shin-Hon (Eric) Chen
(74) *Attorney, Agent, or Firm* — Edward J. Wixted, III, Esq.; Rachel L. Pearlman, Esq.; Heslin Rothenberg Farley and Mesiti P.C.

(57) ABSTRACT

A method, computer program product, and a system where a secure interface control determines functionality of a secure guest based on metadata. The secure interface control ("SC") obtains metadata linked to an image of a secure guest to be started by an owner and managed by the hypervisor, where the metadata comprises control(s) that indicate whether a secure guest generated with the image is permitted to obtain a response to a particular request. The SC intercepts, from the secure guest generated with the image, during runtime, a request. The SC determines, based on the control(s), if the secure guest is permitted to obtain a response to the request. If permitted, the SC commences fulfillment of the request, within the computing system. If not permitted, the SC ignores the request.

18 Claims, 6 Drawing Sheets

(51) Int. Cl.
  *G06F 21/57* (2013.01)
  *G06F 21/60* (2013.01)
  *G06F 21/64* (2013.01)
  *H04L 9/08* (2006.01)
  *H04L 9/14* (2006.01)

(52) U.S. Cl.
  CPC ............ *G06F 21/64* (2013.01); *H04L 9/0819* (2013.01); *H04L 9/14* (2013.01); *G06F 2009/45587* (2013.01); *G06F 2221/034* (2013.01)

(56) References Cited

U.S. PATENT DOCUMENTS

| | | | |
|---|---|---|---|
| 9,418,229 | B2 | 8/2016 | Lau et al. |
| 9,477,524 | B2 | 10/2016 | Kang |
| 9,525,752 | B2 | 12/2016 | Pennington et al. |
| 9,858,140 | B2 | 1/2018 | Gabor et al. |
| 9,953,168 | B1* | 4/2018 | Lango ................... H04L 9/3268 |
| 9,959,139 | B2 | 5/2018 | Kang |
| 10,356,128 | B1* | 7/2019 | Lango ................ H04L 63/0263 |
| 10,579,426 | B2 | 3/2020 | Kang |
| 2011/0271279 | A1* | 11/2011 | Pate ..................... G06F 9/45558 718/1 |
| 2012/0054486 | A1 | 3/2012 | Lakkavalli et al. |
| 2012/0110337 | A1 | 5/2012 | Murphey et al. |
| 2013/0031538 | A1 | 1/2013 | Skalsky |
| 2014/0208123 | A1* | 7/2014 | Roth ...................... G06F 21/575 713/189 |
| 2014/0258716 | A1* | 9/2014 | MacMillan ............. G06F 21/53 713/164 |
| 2015/0178504 | A1* | 6/2015 | Nystrom ............... H04L 9/0897 713/2 |
| 2016/0132345 | A1* | 5/2016 | Bacher .................... G06F 21/57 718/1 |
| 2016/0148001 | A1 | 5/2016 | Bacher et al. |
| 2016/0328335 | A1 | 11/2016 | Bhattacharyya et al. |
| 2016/0378538 | A1 | 12/2016 | Kang |
| 2017/0249157 | A1 | 8/2017 | Bayer et al. |
| 2017/0351536 | A1* | 12/2017 | Kamalakantha .... G06F 9/45558 |
| 2018/0007040 | A1 | 1/2018 | Thom et al. |
| 2018/0019979 | A1* | 1/2018 | Bacher ................ G06F 9/45545 |
| 2018/0111979 | A1 | 4/2018 | Phopase et al. |
| 2018/0239892 | A1 | 8/2018 | Bish et al. |
| 2018/0246760 | A1 | 9/2018 | Kang |
| 2020/0285759 | A1 | 9/2020 | Buendgen et al. |

FOREIGN PATENT DOCUMENTS

| | | |
|---|---|---|
| JP | 2016523421 A | 8/2016 |
| TW | 201214139 | 4/2012 |
| WO | 2012024181 A1 | 2/2012 |
| WO | 2013145375 A1 | 10/2013 |
| WO | WO2018111979 | 6/2018 |

OTHER PUBLICATIONS

List of IBM Patents or Patent Applications Treated as Related, Jan. 13, 2023, 2 pages.
"Notice of Reasons for Refusal" JP2021549838. Jul. 28, 2023. 2 pages.
Tikhvinskiy et al., "Qos Requirements as Factor of Trust to 5G Network", Journal of Telecommunication and Information Technology, Jan. 2016, 6 pages.
International Search Report of International Application No. PCT/EP2020/055155, mailed Jun. 9, 2020, 5 pages.
Taiwan Office Action and Search Report, Taiwan Application No. 109104692, mailed Dec. 25, 2020.
International Search Report of International Application No. PCT/EP2020/055098, mailed May 7, 2020, 4 pages.
Australian Office Action and Examination Report, Australian Application No. 2020233906, mailed Jan. 14, 2022.
Mell et al., "The NIST Definition of Cloud Computing", National Institute of Standards and Technology, U.S. Department of Commerce, NIST Special Publication 800-145, Sep. 2011, 7 pages.

* cited by examiner

SECURE EXECUTION GUEST OWNER CONTROLS FOR SECURE INTERFACE CONTROL

BACKGROUND

In today's computer systems and information transport networks, cryptographic elements are important technological components. Information may be stored or transmitted in a cryptographically secured form in order to avoid unauthorized access to the information stored or transmitted. In some cases, pure software-based techniques may be used and, in other cases, hardware support and security specific elements may be used to perform such data protection.

A hypervisor or virtual machine manager can control various guests (e.g., virtual machines, virtual servers) with access to system resources. Different guests managed by a common hypervisor can be generated by different owners. Of these guests, some can be secure guests. A traditional hypervisor has full control over all guests hosted. In particular, the hypervisor has the capability to inspect and even modify all memory of the hosted guest. In a cloud environment such a setup requires the hypervisor and its administrators to be fully trustworthy.

A secure guest is a guest that can be hosted by hypervisors that are not (fully) trustworthy. The image of such a guest would be protected when loaded and the protection of the contents of the resources assigned to the guest (e.g., memory, CPU registers) would be maintained throughout the life time of the guest. The protection of the guest comprises at least integrity protection (e.g., hypervisor cannot maliciously change any guest states) and in addition can comprise maintaining the confidentiality of the initial image and code and data running in the guest.

SUMMARY

Shortcomings of the prior art are overcome and additional advantages are provided through the provision of a method for enabling an owner to utilize a secure interface control to manage functionality of a secure guest. The method includes, for instance: obtaining, by a secure interface control in a computing system, wherein the secure interface control are communicatively coupled to a hypervisor, wherein the hypervisor manages one or more guests, metadata linked to an image of a secure guest to be started by an owner and managed by the hypervisor, wherein the metadata comprises one or more controls, wherein the each control of the one or more controls indicates to the secure interface control whether a secure guest generated with the image is permitted to obtain a response to a particular request; intercepting, by the secure interface control, via the hypervisor, from the secure guest generated with the image, during runtime of the secure guest, a request; determining, by the secure interface control, based on the one or more controls, if the secure guest is permitted to obtain a response to the request; based on determining that the secure guest is permitted to obtain the response, commencing, by the secure interface control, fulfillment of the request, within the computing system; and based on determining that the secure guest is not permitted to obtain the response, ignoring, by the secure interface control, the request.

Shortcomings of the prior art are overcome and additional advantages are provided through the provision of a computer program product for enabling an owner to utilize a secure interface control to manage functionality of a secure guest. The computer program product comprises a storage medium readable by a processing circuit and storing instructions for execution by the processing circuit for performing a method. The method includes, for instance: obtaining, by the one or more processors in a computing system, wherein the one or more processors are communicatively coupled to a hypervisor, wherein the hypervisor manages one or more guests, metadata linked to an image of a secure guest to be started by an owner and managed by the hypervisor, wherein the metadata comprises one or more controls, wherein the each control of the one or more controls indicates to the one or more processors whether a secure guest generated with the image is permitted to obtain a response to a particular request; intercepting, by the one or more processors, via the hypervisor, from the secure guest generated with the image, during runtime of the secure guest, a request; determining, by the one or more processors, based on the one or more controls, if the secure guest is permitted to obtain a response to the request; based on determining that the secure guest is permitted to obtain the response, commencing, by the one or more processors, fulfillment of the request, within the computing system; and based on determining that the secure guest is not permitted to obtain the response, ignoring, by the one or more processors, the request.

Shortcomings of the prior art are overcome and additional advantages are provided through the provision of a system for enabling an owner to utilize a secure interface control to manage functionality of a secure guest. The system comprises a memory, one or more processors in communication with the memory, and program instructions executable by the one or more processors via the memory to perform a method. The method includes, for instance: obtaining, by the one or more processors in a computing system, wherein the one or more processors are communicatively coupled to a hypervisor, wherein the hypervisor manages one or more guests, metadata linked to an image of a secure guest to be started by an owner and managed by the hypervisor, wherein the metadata comprises one or more controls, wherein the each control of the one or more controls indicates to the one or more processors whether a secure guest generated with the image is permitted to obtain a response to a particular request; intercepting, by the one or more processors, via the hypervisor, from the secure guest generated with the image, during runtime of the secure guest, a request; determining, by the one or more processors, based on the one or more controls, if the secure guest is permitted to obtain a response to the request; based on determining that the secure guest is permitted to obtain the response, commencing, by the one or more processors, fulfillment of the request, within the computing system; and based on determining that the secure guest is not permitted to obtain the response, ignoring, by the one or more processors, the request.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects. For example, in some embodiments of the present invention, the secure guest is permitted to obtain the response, and the method further comprises: obtaining, by the secure interface control and/or the one or more processors, the response to the request; and transmitting, by the secure interface control and/or the one or more processors, the response to the secure guest.

In some embodiments of the present invention, the secure interface control and/or the one or more processors obtaining the metadata further comprises: decrypting, by the secure interface control and/or the one or more processors, a portion of the metadata linked to an image of a secure guest, wherein the metadata is integrity protected and the portion was encrypted by a key derived using a private key comprising a cryptographic measure of a boot image of the secure guest.

In some embodiments of the present invention, the encrypted portion of the metadata comprises the one or more controls.

In some embodiments of the present invention, the request is selected from the group consisting of: a request to the secure interface control and/or the one or more processors to output a wrapped key used to export a page, a request to the secure interface control and/or the one or more processors to generate metadata for an updated version of the boot image of the secure guest, a request to allow the secure interface control and/or the one or more processors to encrypt data using keys provided in the metadata and return the encrypted data to the secure guest.

In some embodiments of the present invention, the response to the request is selected from the group consisting of: the wrapped key used to export the page, the metadata for the updated version of the boot image of the secure guest, and encrypted data, wherein the encrypted data was encrypted by the secure interface control and/or the one or more processors utilizing the keys provided in the metadata.

In some embodiments of the present invention, the private key is owned by the secure interface control and/or the one or more processors and used exclusively by the secure interface control and/or the one or more processors.

In some embodiments of the present invention, the key derived using the private key is shared between the secure interface control and/or the one or more processors and the owner.

In some embodiments of the present invention, the metadata comprises values derived from a boot image of the secure guest computed utilizing a collision resistant one-way function.

In some embodiments of the present invention, the one or more controls each comprise a positive designation or a negative designation for various features, wherein the positive designation indicates that the secure guest is permitted to obtain the response to the particular request and the negative designation indicates that the guest is not permitted to obtain the response to the particular request.

In some embodiments of the present invention, the metadata is inaccessible to the secure guest.

In some embodiments of the present invention, the secure interface control and/or the one or more processors determining if the secure guest is permitted to obtain the response to the request further comprises: identifying, by the secure interface control and/or the one or more processors, in the one or more controls, a control relevant to the request; and determining, by the secure interface control and/or the one or more processors, if the control enables or restricts receiving the response to the request by the secure guest.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
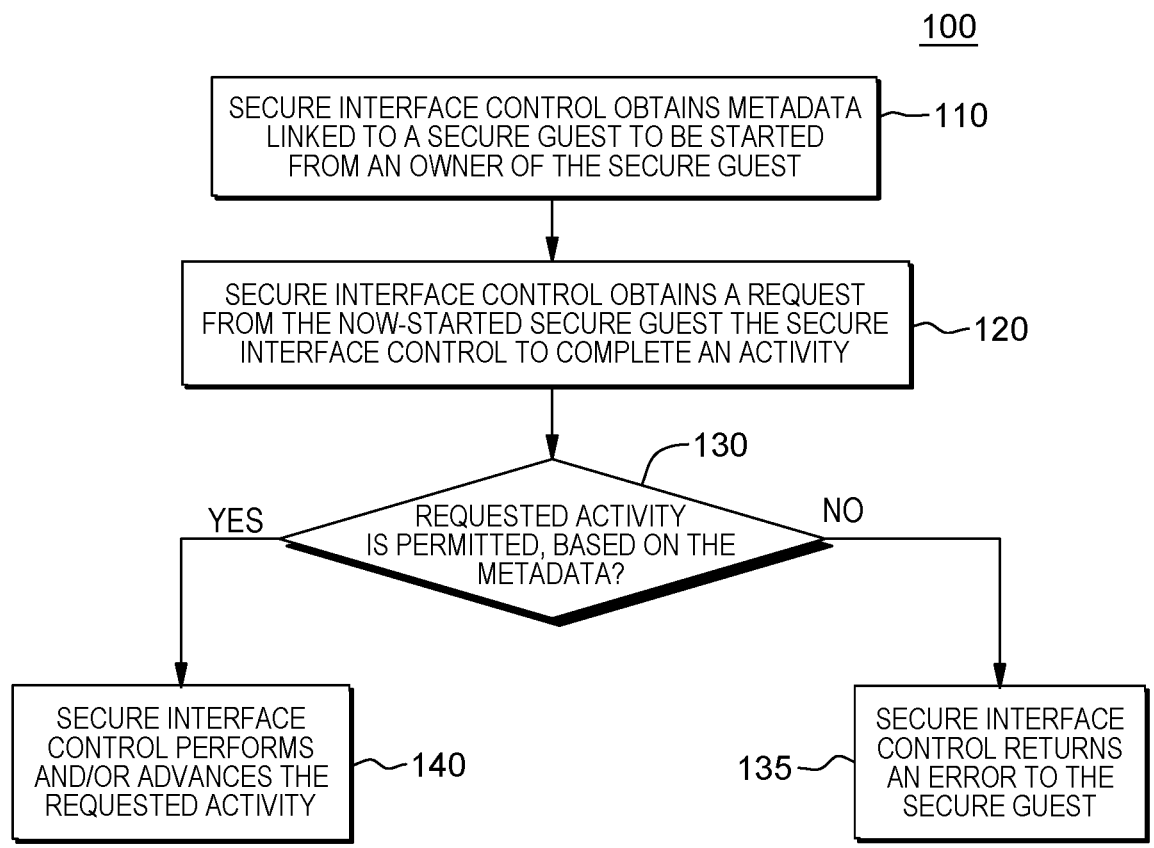
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
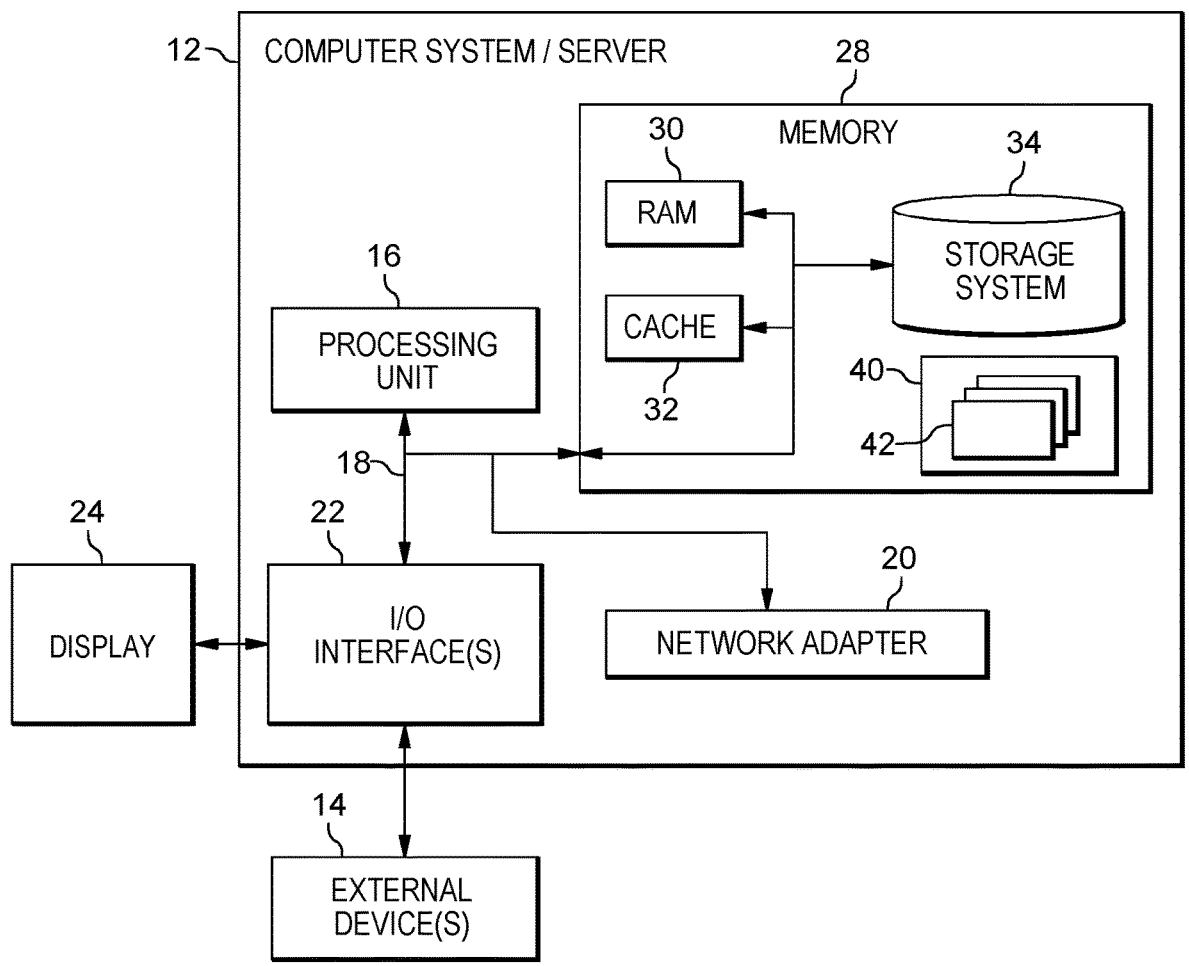
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

The term 'guest system' or 'guest' can denote, e.g., an operating system being executed in a virtual machine, VM, on a hypervisor. A user can be assigned to the guest system. It can be that a specific cryptographic key can be assigned to the guest system. The mentioned hypervisor can be used in performing such an assignment. The guest system can, e.g., be a virtual machine, i.e., a VM, running or executing a guest operating system.

The term 'content' can denote any character-based string. The string can comprise readable text or any other binary data.

The term 'a data pattern' can basically be another expression for content. The data pattern can denote a string of readable characters or can include binary data. In the context of this document, no additional requirements are placed on the data pattern. It can also be predefined, randomly selected or, otherwise determined.

The term 'guest encryption unit' can denote a module adapted to perform an encryption and/or decryption operation within or, as part of the guest system or, as a service used by the guest system.

As aforementioned, a secure guest is a guest that can be hosted by hypervisors that are not (fully) trustworthy. The image of such a guest would be protected when loaded and the protection of the contents of the resources assigned to the guest (e.g., memory, CPU registers) would be maintained throughout the life time of the guest. The protection of the guest comprises at least integrity protection (i.e., hypervisor cannot maliciously change any guest states) and in addition can comprise maintaining the confidentiality of the initial image and code and data running in the guest.

In embodiments of the present invention, because a secure guest is necessarily integrity protected (and the secure guest is secure while the hypervisor may not be fully trusted), in order to manage such a secure guest, a secure interface control (e.g., a trusted component, trusted firmware) of a computer system takes over certain tasks involved in hosting the guest and grants to the hypervisor only limited access to the secure guest. Specifically, the secure interface control provides access to the hypervisor that does not involve inspecting or modifying the guest status of the secure guest (and/or the image of the secure guest).

In embodiments of the present invention, when a secure guest is deployed an owner prepares the guest image (of the secure guest) together with some secure guest metadata. As will be discussed herein, the guest metadata can comprise secrets (e.g., cryptographic keys) needed to verify the integrity of the guest and possibly to maintain the confidentiality of the guest. Since the secrets in the metadata of a secure guest are only known to the guest owner and the secure interface control, a part of the metadata (i.e., the part containing the secrets) is encrypted and cryptographically linked to the guest image with a key that is securely negotiated between the secure interface control and the guest owner, using a private/public key pair of which the private key is securely maintained by the secure interface control.

Embodiments of the present invention include a computer-implemented method, a computer program product, and a computer system that include program code executed on at least one processing circuit and/or hardware comprising program code that enables an owner of a secure execution (SE) guest to instruct a secure interface control that is hardware, firmware, or a combination thereof, to enable and/or disable various operations of a given SE guests of the owner, during the runtime of the SE guest. Thus, by utilizing the secure interface control, a SE owner can enable or disable various functionality for each guest image, on an image by image (i.e., secure guest by secure guest) basis. The owner communicates the particulars for a given via image metadata that is cryptographically linked to the boot image of the secure guest and the secure interface control enforces the specified particulars, in embodiments of the present invention, for the given secure guest. In some embodiments of the present invention, the metadata associated with a secure guest is integrity protected (e.g., at least part of the metadata can be encrypted). The metadata can contain values derived by program code from the boot image of the secure guest that the program code computes using a collision resistant one-way function (e.g., a cryptographic hash function). The collision resistant function provides security to the values because its application renders computationally infeasible constructing an alternative image for which the same values can be derived. In some embodiments of the present invention, the metadata comprises specific positive and negative designations for various features. In some embodiments of the present invention, the metadata comprises installation data of the secure guest (e.g., the secure execution (SE) header).

In embodiments of the present invention, when the secure interface control evaluates whether to enable or disable functionality (e.g., identifying positive or negative indications in the metadata) for a given secure guest, the secure interface control reads individual controls for each functionality, in the metadata. In embodiments of the present invention, for a running secure guest, the secure interface control obtains each request (from components of the system including, but not limited to, the secure guest), determines whether the request is permissible, transmits the request to a relevant control for execution, if permissible, and ignores the request, if impermissible. In embodiments of the present invention, the secure interface control permits and/or ignores requests, including but not limited to, the following, based on values in metadata associated with a secure guest: 1) a request to the secure interface control to output a wrapped key used to export a page (e.g., to support a hypervisor-driven guest dump encrypted by a key generated by the secure interface control, which is encrypted by a key provided in the metadata); 2) a request to the secure interface control to generate metadata for an updated version of the boot image of a secure guest; and/or 3) a request to allow the secure interface control to encrypt data using keys provided in metadata of a secure guest and return the encrypted data. The metadata enables a granular control of functionality, for example, regarding the first item, the through the metadata, the SE guest owner can decide whether the secure interface control is allowed to export the key used to encrypt exported data, even if encrypted with a key shared by the secure interface control and the owner, only.

FIG. 1 is a workflow 100 that illustrates certain functionality of some embodiments of the present invention. As will be illustrated in FIG. 1, in embodiments of the present invention, to enable secure execution, a secure guest is cryptographically linked to metadata, which is securely communicated to a secure interface control (e.g., a trusted hardware and/or software component, trusted firmware, an ultravisor) based on a private host key, which is accessible to the secure interface control, only. In embodiments of the present invention, an owner of the secure guest controls the secure interface control behavior, allowing or prohibiting certain operations on the execution of a secure guest. An advantage of embodiments of the present invention over existing approaches to secure guest security is that the granular controls in the metadata, as enforced by the secure interface control, allow the owner to limit operations or enable operations in order to address specific security concerns. For example, the owner can control whether the secure interface control can export a key used to encrypt exported data, even if the data is encrypted with a key shared by the secure interface control and the owner, only. In some embodiments of the present invention, wherein the key is derived using a private key that is shared between the secure interface control and the owner. In embodiments of the present invention, program code executing on at least one processing circuit and/or provided by hardware, constrains the execution of a secure guest.

Referring to FIG. 1, in some embodiments of the present invention, a secure interface control (e.g., hardware, software, firmware, a combination, etc.) obtains metadata linked to a secure guest to be started from an owner of the secure guest (110). In some embodiments of the present invention, the metadata is integrity protected and cryptographically linked to a boot image of the secure guest to be started by an (SE) owner. The metadata comprises controls and each control denotes a restriction for the secure guest. In an embodiments of the present invention, the secure interface control obtains a request from the now-started secure guest the secure interface control to complete an activity (120). The secure interface control analyzes the metadata to determine if the requested activity is permitted, based on the metadata (130). If the secure interface control determines that the activity is not permitted, based on the metadata, the secure interface control returns an error to the secure guest (135). In some embodiments of the present invention, the secure interface control ignores the request. Depending on a configuration of the secure interface control, a response to an unpermitted request can vary. If the secure interface control determines that the activity is permitted, based on the metadata, the secure interface control performs and/or advances (e.g., writes, reads, transmits) the requested activity (140). Thus, the secure interface control denies requests that conflict with restrictions described by the metadata. The prevention and allowance of various requests is accomplished by the secure interface control during the runtime of the secure guest.

Here is a non-limiting list of activities that a secure guest can request that a secure interface control perform and/or advance and the secure interface control can determine whether these activities are constrained, based on the metadata: 1) the secure guest can request that the secure interface control output a wrapped key used to export a page (e.g., to support a hypervisor-driven guest dump, encrypted by a key generated by the secure interface control, which is encrypted by a key provided in the metadata); 2) the secure guests can request that the secure interface control generate metadata for an updated version of the boot image of the secure guest; and 3) the secure guest can request that the secure interface control encrypt data using keys provided in the metadata of the secure guest, and return the encrypted data.

Figure 2:
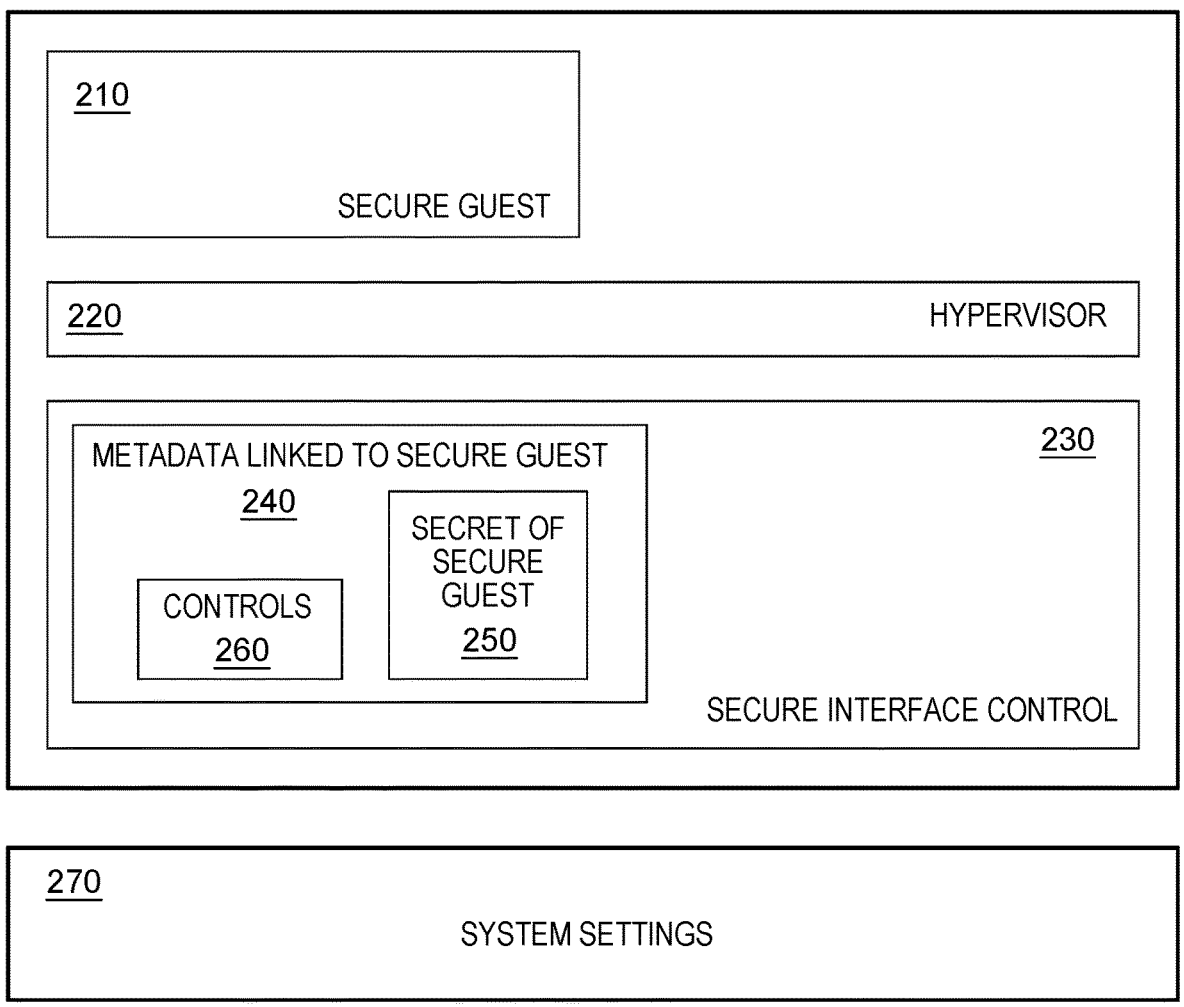
FIG. 2 illustrates various aspects of some embodiments of the present invention.

FIG. 2 is a technical environment 200 that includes various aspects of some embodiments of the present invention. The components that comprise the technical environment 200 of FIG. 2 illustrate how a secure interface control enables a guest owner to control functionality of a guest image via encryption unique to each owner, and the secure interface control enables/disables particular features of a given secure guest during runtime. For Secure Execution, a secure guest 210 is cryptographically linked to metadata 240, which is securely communicated to a secure interface control 230 (e.g., trusted FW, ultravisor, trusted component, etc.), based on a private host key which is accessible to the secure interface control 230, only. The owner of the secure guest 210 controls the secure interface control 230 allowing or prohibiting certain operations on the execution of a secure guest 210, based preferences of the owner. For example, the functionality permitted by the owner, through the secure interface control 230, could be limited to operations that allow for attacks the owner of the secure guest 210 is either concerned about or is not concerned about. For example, an owner can populate in the metadata 240 cryptographically linked to an image of a secure guest 210 whether the secure guest 210 is enabled to the key utilized to encrypt portions of the metadata, even if the metadata is encrypted with a key shared by the secure guest 210 and the owner, only. In some embodiments of the present invention, the key is derived using a private key that is shared between the secure interface control 230 and the owner of the secure guest 210. Based on the preferences of the owner, as noted in the metadata 240 associated with the secure guest 210, the secure interface control 230 controls operations of the secure guest 210, during runtime of the secure guest 210.

In some embodiments of the present invention, a secure guest 210 (e.g., virtual machine, virtual server) is controlled by a hypervisor 230 (e.g., virtual machine manager). The secure interface control 250 obtains, from the secure guest 210, via the hypervisor 230, metadata associated with the secure guest 240. This metadata 240 is integrity protected (and part of the metadata 230, i.e., a secret of secure guest 250 is also confidentiality protected (i.e., encrypted)). In some embodiments of the present invention, the metadata 240 is cryptographically linked to the boot image of the secure guest 240. In some embodiments of the present invention, the secret of the secure guest 250 is contained in the installation data of the secure guest (e.g., the secure execution (SE) header). In some embodiments of the present invention, the metadata 240 contains values derived from the boot image of the secure guest 210 that are computed using a collision resistant one-way function (e.g., a cryptographic hash function) such that constructing an alternative image for which the same values can be derived is computationally infeasible.

As illustrated in FIG. 2, the metadata linked to the secure guest 240 comprises a secret 250. In some embodiments of the present invention, the metadata of the guest is integrity protected and the secret is encrypted by a key derived using a private key owned by the secure interface control 230. The derived key can protect a cryptographic measure of a boot image of the given guest. This, in some embodiments of the present invention, the portion of the metadata 240 that contains the secret 250 is encrypted by a key that only a the secure interface control 230 can compute. The metadata 240 need not be accessible to the secure guest 210, itself.

The metadata 240 is linked to the image of the secure guest 210, the secret 250 being cryptographically linked to the image of the secure guest, but it is not part of the guest. Rather, as described herein, it is independently transported to the secure interface control (e.g., firmware, a trusted component, software, hardware, etc.) (e.g., FIG. 1, 110). In embodiments of the present invention, the secret 250 is transported though a secure channel (i.e., encrypted) as part of the guest metadata and cryptographically linked to the guest. In some embodiments of the present invention, the metadata 240 is cryptographically linked to a guest (e.g., contains a signature of the guest image) so metadata of one guest cannot be misused as metadata of another guest. Thus, the trusted component can verify that guest and metadata/secret belong together. The metadata 240 transferred (e.g., independently, through a secure channel) to the secure interface control 230 is integrity and confidentiality protected.

In addition to including a secret 250, the metadata 240 also includes controls 260, which the secure interface control 230 utilizes to enable and prohibit various functionality. The interactions between the secure guest 210 and various elements of the technical environment 200, are determined by the secure interface control 230, based on comparing the controls 260 in the metadata 240 to the system settings 270. The secure interface control 230 denies requests from the secure guest 210 that conflict with restrictions described by the metadata 240 (e.g., the controls 260). In some embodiments of the present invention, the metadata 240 contains controls 260 denoting a capability of the secure interface control 230 that may be enabled, if the control is positive, or disabled, if the controls is negative.

In some embodiments of the present invention, the secure interface control 230 evaluates the metadata 240 for a secure guest 210 by reading the controls 260 for each control. When running a secure guest 210, the secure interface control 230 can check each request from various components of the technical environment 200, including from the secure guest 210 to determine whether executing the request is permissible. If permissible, the running a secure guest 210 will take an action (write, read, transmit, etc.) targeting the control for the request, to complete the request. If the secure interface control 230 determines that the request is impermissible, the secure interface control 230 can ignore or otherwise reject the request. Thus, the secure interface control 230 can control requests both from the secure guest 210 and that impact the secure guest 210, based on the metadata 240 of the secure guest 210.

Figure 3:
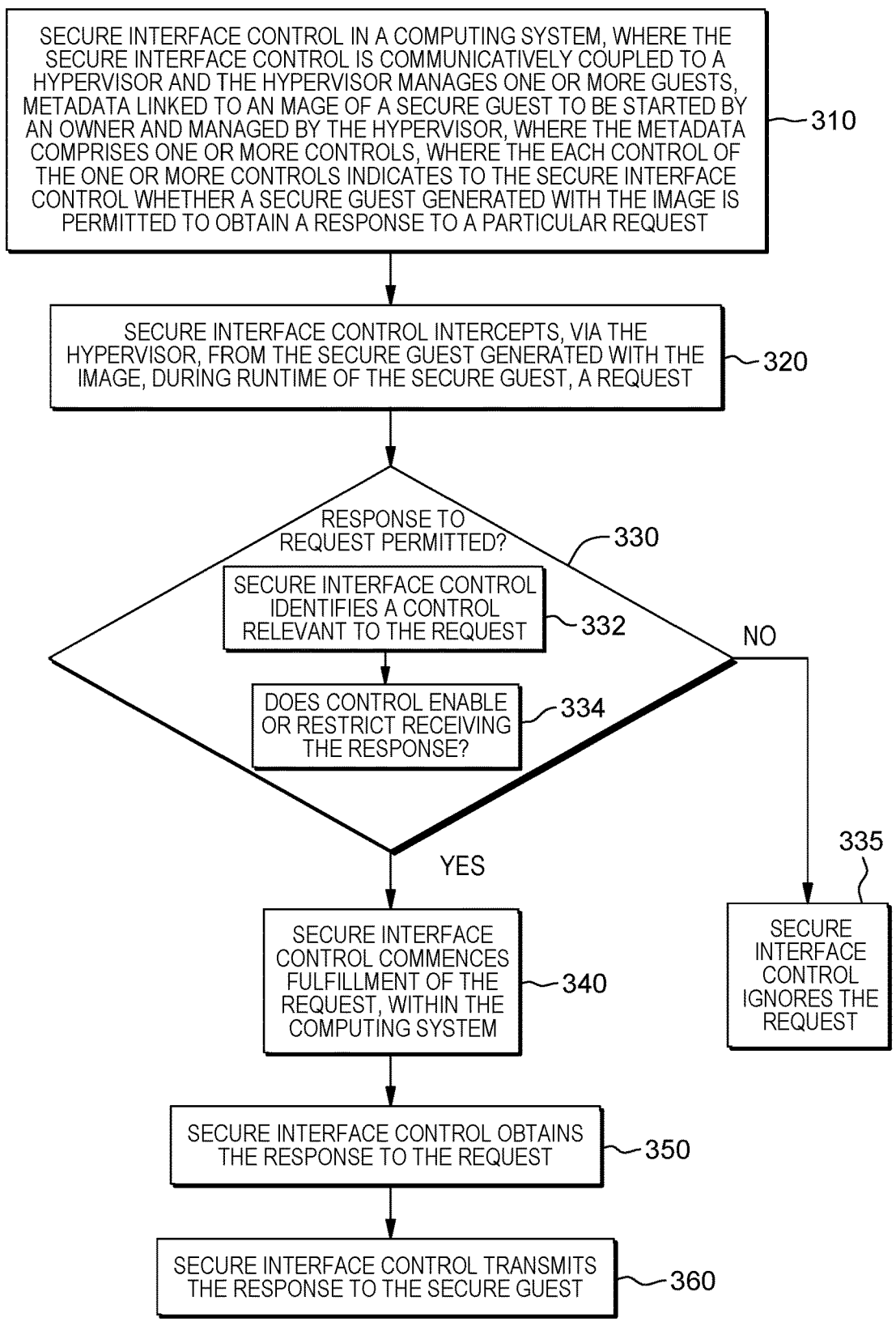
FIG. 3 is a workflow that illustrates certain aspects of some embodiments of the present invention.

FIG. 3 is a workflow 300 that illustrates various aspects of some embodiments of the present invention. In embodiment of the present invention, a secure interface control in a computing system, where the secure interface control is communicatively coupled to a hypervisor and the hypervisor manages one or more guests, metadata linked to an image of a secure guest to be started by an owner and managed by the hypervisor, where the metadata comprises one or more controls, where the each control of the one or more controls indicates to the secure interface control whether a secure guest generated with the image is permitted to obtain a response to a particular request (310). The metadata itself can be inaccessible to the secure guest. As part of obtaining the metadata, in some embodiments of the present invention, the secure interface control decrypts a portion of the metadata linked to an image of a secure guest. The metadata is integrity protected and this portion was encrypted by a key derived using a private key, the encrypted portion comprising a cryptographic measure of a boot image of the secure guest, in some embodiments of the present invention. The private key can be owned by the secure interface control and used exclusively by the secure interface control. A key derived using the private key can be shared between the secure interface control and the owner (e.g., only). In some embodiments of the present invention, the metadata includes values derived from a boot image of the secure guest computed utilizing a collision resistant one-way function.

As illustrated in FIG. 2, the one or more controls (e.g., FIG. 2, 260) are part of the metadata (e.g., FIG. 2, 240). In some embodiments of the present invention, the one or more controls are contained in an encrypted portion of the metadata. The secure interface control can decrypt this portion of the metadata, which is linked to an image of the secure guest, where the metadata is integrity protected and the portion was encrypted by a key derived using a private key comprising a cryptographic measure of a boot image of the secure guest. The control can each comprise a positive designation or a negative designation for various features, where the positive designation indicates that the secure guest is permitted to obtain the response to the particular request and the negative designation indicates that the guest is not permitted to obtain the response to the particular request.

Returning to FIG. 3, the secure interface control intercepts, via the hypervisor, from the secure guest generated with the image, during runtime of the secure guest, a request (320). Some non-limiting examples of requests handled by aspects of some embodiments of the present invention include: a request to the secure interface control to output a wrapped key used to export a page, a request to the secure interface control to generate metadata for an updated version of the boot image of the secure guest, a request to allow the secure interface control to encrypt data using keys provided in the metadata and return the encrypted data to the secure guest. Some non-limiting examples of responses to requests provided by the secure interface control to the requested secure guest in embodiments of the present invention include: the wrapped key used to export the page, the metadata for the updated version of the boot image of the secure guest, and encrypted data, wherein the encrypted data was encrypted by the secure interface control utilizing the keys provided in the metadata.

Referring to FIG. 3, the secure interface control determines, based on the one or more controls, if the secure guest is permitted to obtain a response to the request (330). To determine whether the secure guest is permitted to obtain the response to the request, in some embodiments of the present invention, the secure interface control identifies, in the one or more controls, a control relevant to the request (332). The secure interface control determines if the control enables or restricts receiving the response to the request by the secure guest (336).

Based on determining that the secure guest is permitted to obtain the response, secure interface control commences fulfillment of the request, within the computing system (340). Based on determining that the secure guest is not permitted to obtain the response, the secure interface control ignores the request (335).

In some embodiments of the present invention, where the secure interface control determines that the secure guest is permitted to obtain the response, the secure interface control obtains the response to the request (350). The secure interface control transmits the response to the secure guest (360).

Embodiments of the present invention include a computer-implemented method, a computer program product, and a computer system, where a secure interface control in a computing system, where the secure interface control can be any one of or a combination of firmware, hardware, and software, obtains metadata linked to an image of a secure guest to be started by an owner and managed by a hypervisor. The hypervisor manages one or more guests and the metadata comprises one or more controls. Each control of the one or more controls indicates to the secure interface control whether a secure guest generated with the image is permitted to obtain a response to a particular request. The secure interface control intercepts, via the hypervisor, from the secure guest generated with the image, during runtime of the secure guest, a request. The secure interface control determines, based on the one or more controls, if the secure guest is permitted to obtain a response to the request. Based on determining that the secure guest is permitted to obtain the response, the secure interface control commences fulfillment of the request, within the computing system. Based on determining that the secure guest is not permitted to obtain the response, the secure interface control ignores the request.

In some embodiments of the present invention, where the secure guest is permitted to obtain the response, the secure interface control obtains the response to the request and transmits the response to the secure guest.

In some embodiments of the present invention, the secure interface control obtaining the metadata further comprises: the secure interface control decrypting a portion of the metadata linked to an image of a secure guest, where in the metadata is integrity protected and the portion was encrypted by a key derived using a private key comprising a cryptographic measure of a boot image of the secure guest. In some embodiments of the present invention, the encrypted portion of the metadata comprises the one or more controls.

In some embodiments of the present invention, the request is selected from the group consisting of: a request to the secure interface control to output a wrapped key used to export a page, a request to the secure interface control to generate metadata for an updated version of the boot image of the secure guest, a request to allow the secure interface control to encrypt data using keys provided in the metadata and return the encrypted data to the secure guest.

In some embodiments of the present invention, the response to the request is selected from the group consisting of: the wrapped key used to export the page, the metadata for the updated version of the boot image of the secure guest, and encrypted data, wherein the encrypted data was encrypted by the secure interface control utilizing the keys provided in the metadata.

In some embodiments of the present invention, the private key is owned by the secure interface control and used exclusively by the secure interface control.

In some embodiments of the present invention, the key derived using the private key is shared between the secure interface control and the owner.

In some embodiments of the present invention, the metadata comprises values derived from a boot image of the secure guest computed utilizing a collision resistant one-way function.

In some embodiments of the present invention, the one or more controls each comprise a positive designation or a negative designation for various features, wherein the positive designation indicates that the secure guest is permitted to obtain the response to the particular request and the negative designation indicates that the guest is not permitted to obtain the response to the particular request.

In some embodiments of the present invention, the metadata is inaccessible to the secure guest.

In some embodiments of the present invention, the secure interface control determining if the secure guest is permitted to obtain the response to the request further comprises: the secure interface control identifying in the one or more controls, a control relevant to the request. The secure interface control determines if the control enables or restricts receiving the response to the request by the secure guest.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the secure guest 210 (FIG. 2), the secure interface control 230 (FIG. 2), and/or the hypervisor 220 (FIG. 2) can each be understood as executing on a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aFlpplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
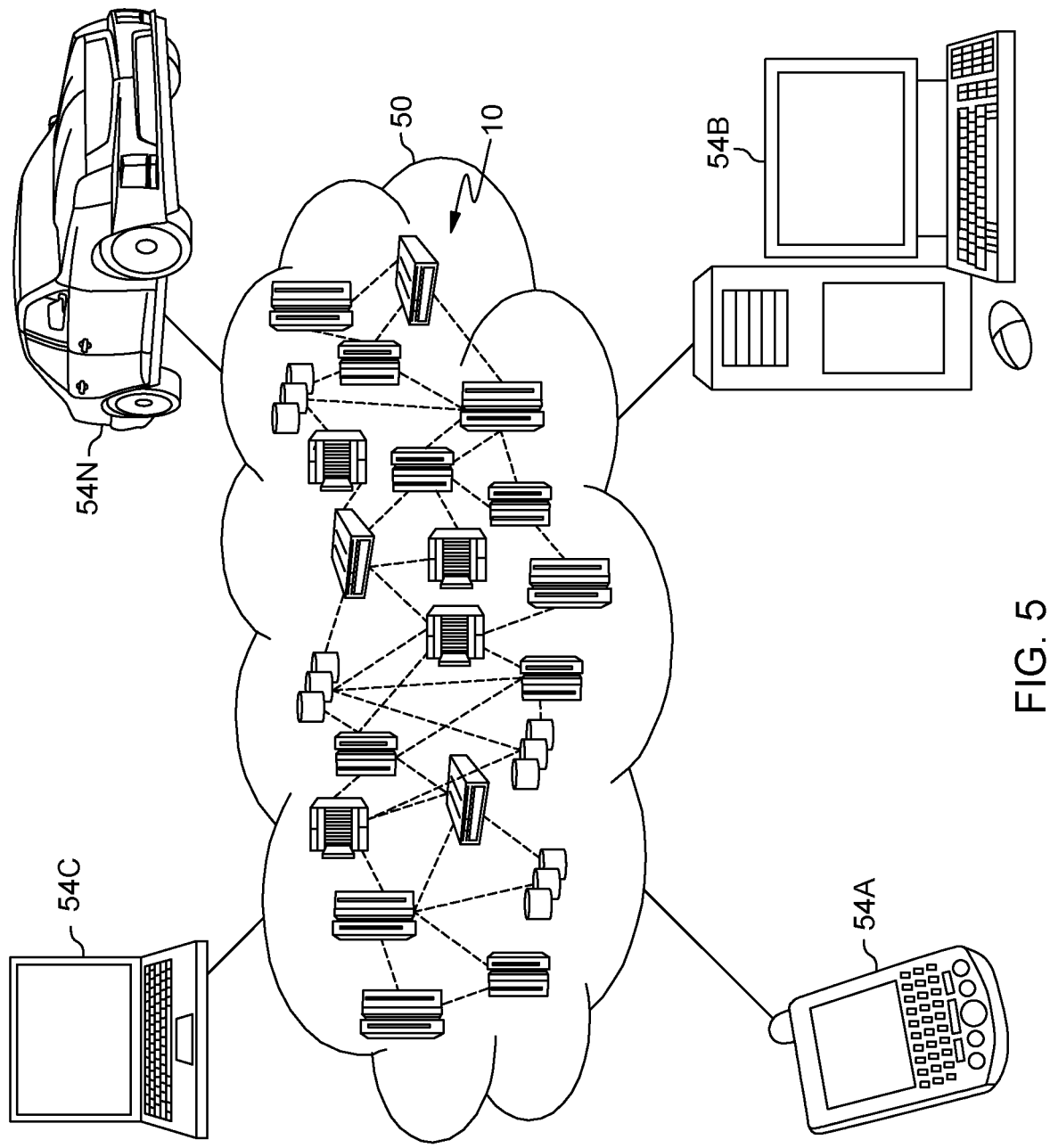
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
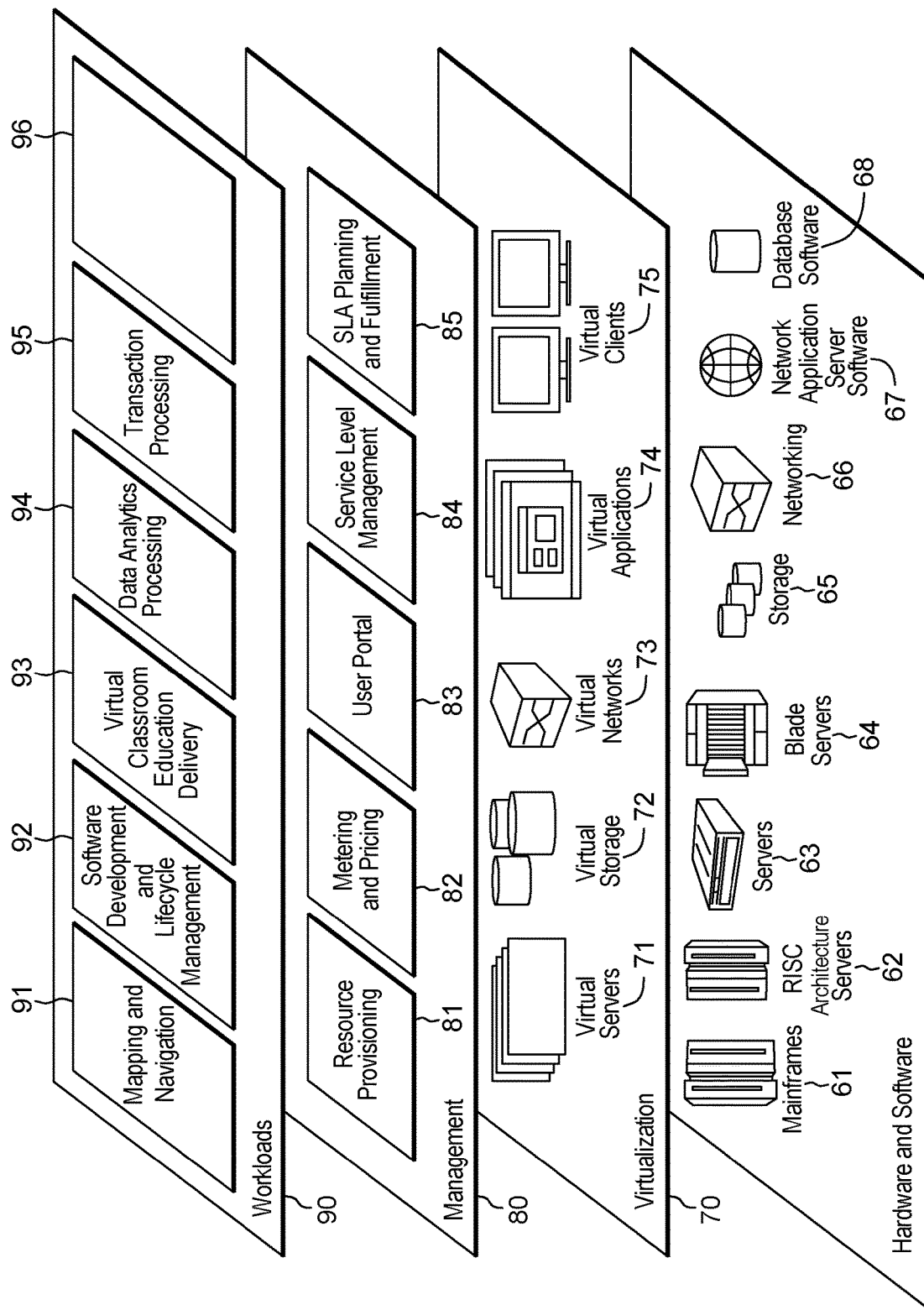
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling the functionality of a secure guest, during runtime, via a secure interface control 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    transmitting, to a secure interface control in a computing system, wherein the secure interface control is communicatively coupled to a hypervisor, wherein the hypervisor manages one or more guests, metadata linked to an image of a secure guest to be started by an owner and managed by the hypervisor, wherein the metadata comprises one or more controls, wherein each control of the one or more controls indicates to the secure interface control whether a secure guest generated with the image is permitted to obtain a response to a particular request;
    transmitting, by the owner, to the secure control interface, a private key comprising a cryptographic measure of the image of the secure guest, wherein a portion of the metadata linked to the image of the secure guest is integrity protected and encrypted by a key derived using the private key;
    transmitting, by the secure guest to the hypervisor, a request, wherein the request is intercepted by the secure interface control en route to the hypervisor, wherein the secure interface control accesses the one or more controls; and
    obtaining, by the secure guest, based on the secure interface control accessing the one or more controls, a response to the request.

2. The computer-implemented method of claim 1, wherein the response comprises the secure interface control commencing fulfillment of the request.

3. The computer-implemented method of claim 1, wherein the response comprises the secure interface control ignoring the request.

4. The computer-implemented method of claim 3, wherein the request is selected from the group consisting of: a request to the secure interface control to output a wrapped key used to export a page, a request to the secure interface control to generate metadata for an updated version of the boot image of the secure guest, a request to allow the secure interface control to encrypt data using keys provided in the metadata and return the encrypted data to the secure guest.

5. The computer-implemented method of claim 3, wherein the response to the request is selected from the group consisting of: the wrapped key used to export the page, the metadata for the updated version of the boot image of the secure guest, and encrypted data, wherein the encrypted data was encrypted by the secure interface control utilizing the keys provided in the metadata.

6. The computer-implemented method of claim 1, wherein obtaining the response to the request is via the hypervisor, wherein the hypervisor transmits the response to the secure guest.

7. The computer-implemented method of claim 1, wherein obtaining the response to the request is via the secure interface control, wherein the secure interface control transmits the response to the secure guest.

8. The computer-implemented method of claim 1, wherein the encrypted portion of the metadata comprises the one or more controls.

9. The computer-implemented method of claim 1, wherein the metadata comprises values derived from a boot image of the secure guest computed utilizing a collision resistant one-way function.

10. The computer-implemented method of claim 1, wherein the one or more controls each comprise a positive designation or a negative designation for various features, wherein the positive designation indicates that the secure guest is permitted to obtain the response to the particular request and the negative designation indicates that the secure guest is not permitted to obtain the response to the particular request.

11. The computer-implemented method of claim 1, wherein the metadata is inaccessible to the secure guest.

12. The computer-implemented method of claim 1, wherein the secure interface control accessing the one or more controls comprises;
- identifying, by the secure interface control, in the one or more controls, a control relevant to the request; and
- determining, by the secure interface control, if the control enables or restricts receiving the response to the request by the secure guest.

13. A computer program product comprising:
a computer readable storage medium readable by one or more processors and storing instructions for execution by the one or more processors for performing a method comprising:
- transmitting, by the one or more processors of an owner of a secure guest, to a secure interface control in a computing system, wherein the secure interface control is communicatively coupled to a hypervisor, wherein the hypervisor manages one or more guests, metadata linked to an image of the secure guest to be started by the owner and managed by the hypervisor, wherein the metadata comprises one or more controls, wherein each control of the one or more controls indicates to the secure interface control whether the secure guest generated with the image is permitted to obtain a response to a particular request;
- transmitting, by the owner, to the secure control interface, a private key comprising a cryptographic measure of the image of the secure guest, wherein a portion of the metadata linked to the image of the secure guest is integrity protected and encrypted by a key derived using the private key;
- transmitting, by the one or more processors, via the secure guest to the hypervisor, a request, wherein the request is intercepted by the secure interface control en route to the hypervisor, wherein the secure interface control accesses the one or more controls; and
- obtaining, by the one or more processors via the secure guest, based on the secure interface control accessing the one or more controls, a response to the request.

14. The computer program product of claim 13, wherein the response comprises the secure interface control commencing fulfillment of the request.

15. The computer program product of claim 13, wherein the response comprises the secure interface control ignoring the request.

16. The computer program product of claim 13, wherein obtaining the response to the request is via the hypervisor, wherein the hypervisor transmits the response to the secure guest.

17. The computer program product of claim 13, wherein obtaining the response to the request is via the secure interface control, wherein the secure interface control transmits the response to the secure guest.

18. A system comprising:
a memory;
one or more processors in communication with the memory;
program instructions executable by the one or more processors via the memory to perform a method, the method comprising:
- transmitting, by the one or more processors of an owner of a secure guest, to a secure interface control in a computing system, wherein the secure interface control is communicatively coupled to a hypervisor, wherein the hypervisor manages one or more guests, metadata linked to an image of the secure guest to be started by the owner and managed by the hypervisor, wherein the metadata comprises one or more controls, wherein each control of the one or more controls indicates to the secure interface control whether the secure guest generated with the image is permitted to obtain a response to a particular request;
- transmitting, by the owner, to the secure control interface, a private key comprising a cryptographic measure of the image of the secure guest, wherein a portion of the metadata linked to the image of the secure guest is integrity protected and encrypted by a key derived using the private key;
- transmitting, by the one or more processors, via the secure guest to the hypervisor, a request, wherein the request is intercepted by the secure interface control en route to the hypervisor, wherein the secure interface control accesses the one or more controls; and
- obtaining, by the one or more processors via the secure guest, based on the secure interface control accessing the one or more controls, a response to the request.

* * * * *